L. K. SCHWALL.
GAS COCK.
APPLICATION FILED MAR. 29, 1915.
1,221,771.
Patented Apr. 3, 1917.
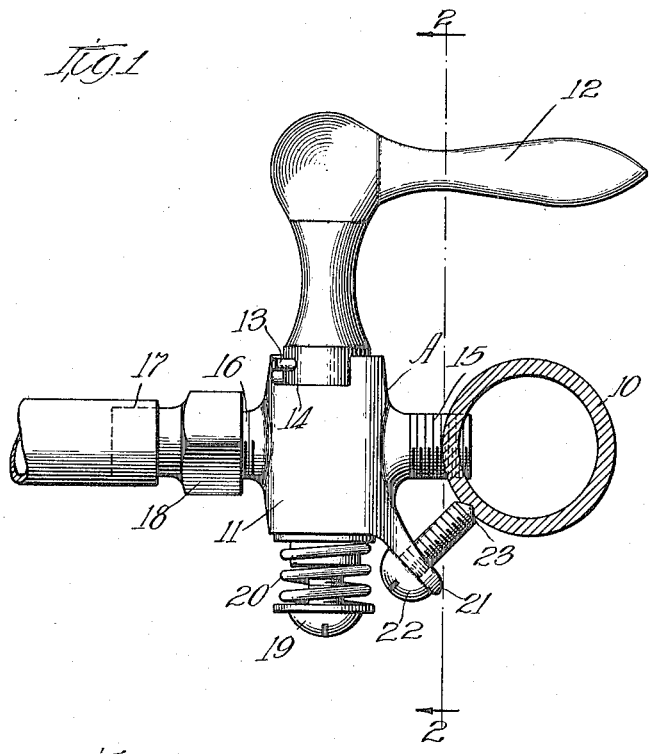
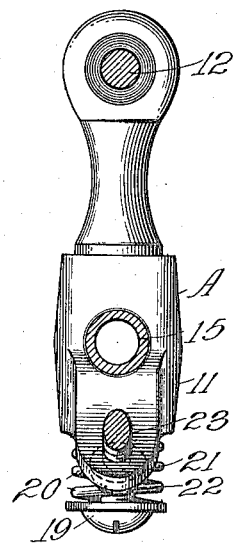

UNITED STATES PATENT OFFICE.

LOUIS K. SCHWALL, OF CHICAGO, ILLINOIS.

GAS-COCK.

1,221,771.

Specification of Letters Patent.

Patented Apr. 3, 1917.

Application filed March 29, 1915. Serial No. 17,696.

*To all whom it may concern:*

Be it known that I, LOUIS K. SCHWALL, a citizen of the United States, residing at Chicago, in the county of Cook and State of Illinois, have invented a certain new and useful Improvement in Gas-Cocks, of which the following is a full, clear, concise, and exact description, reference being had to the accompanying drawings, forming a part of this specification.

This invention relates to improvements in gas cocks and the like.

Heretofore, in restaurants and other places wherein gas stoves are subjected to severe use, considerable difficulty has been encountered due to the fact that the gas cocks become loosened and turn relatively to the pipe to which they are attached. That is, the repeated turning on and off of the valve, causes the cock to turn from its normal upright position off to one side with the result that it becomes inconvenient and difficult to properly manipulate the valve.

The object of my invention is to provide simple means to overcome the difficulties above outlined and while I have shown my improvements in connection with a gas cock only, it will be understood by those skilled in the art that the improvements may be used to equal advantage with other analogous devices such for instance as faucets, spigots, and cocks used in other devices, particularly internal combustion engines where great vibration is encountered.

In the drawing forming a part of this specification, Figure 1 is a side elevation of a gas cock showing my improvements in connection therewith, the pipe to which it is attached being shown in section and Fig. 2 is a vertical sectional view taken substantially on the line 2—2 of Fig. 1.

In said drawing, 10 denotes the gas supply pipe such as is commonly found extending across the front of a gas stove. The improved gas cock A is shown as comprising a hollow body member 11 having the usual valve chamber therewithin in which is mounted the plug valve (not detailed in the drawing) which valve is operated in the usual manner by a handle 12, the turning movement of the valve being limited by a pin 13 operating in a recess 14 in the usual manner. As shown, the gas cock is provided with an exteriorly threaded nipple 15 adapted to be screwed into the pipe 10. On the opposite side to that on which the nipple 15 is located, a second nipple 16 is provided to which the pipe 17 leading to the burner may be attached as by a coupling 18. As shown, the plug valve is held in proper position by means of a tension screw 19 and spring 20. All of the foregoing parts are or may be of any well known or desired construction.

To prevent the gas cock from turning bodily, I have provided the body 11 thereof with a downwardly inclined lug or flange 21 on the same side as the nipple 15. Said lug or flange is provided with an interior thread with which coöperates an adjustable set screw 22, the latter having preferably a pointed inner end 23 adapted to bite into the pipe or other member 10 to which the gas cock is attached.

From the preceding description, it will be seen that after the gas cock has been threaded into the pipe 10 the requisite amount, the set screw 22 may then be tightened and on account of its biting into the pipe, will positively prevent the gas cock from accidental turning movement and thus overcome the difficulties heretofore referred to and always insuring the operating handle for the valve extending in its proper vertical direction.

Although I have herein shown and described what I now consider the preferred embodiment of my improvement, yet it will be understood that changes and modifications may be made in the details of construction and arrangements of parts, without departing from the spirit of the invention, and all such changes and modifications are contemplated as come within the scope of the claims appended hereto.

I claim:—

1. A gas cock or the like comprising a hollow body portion provided with a valve chamber and a threaded nipple by which it is adapted to be attached to a pipe or the like, and means for preventing accidental bodily turning of said cock when the same is attached to the pipe, said means including a lug formed integrally with said body portion, and a member adjustably carried by said lug and adapted to engage and be tightened against said pipe.

2. A gas cock or the like comprising a hollow body portion provided with a valve chamber and a threaded nipple by which it is adapted to be attached to a pipe or other member, and means for preventing accidental bodily turning of said body when the same is attached to the pipe or other member, said means including a set screw adapted to be tightened against said pipe or other member into which the cock is threaded.

3. A a gas cock or the like comprising a hollow body portion provided with a valve chamber and a threaded nipple by which it is adapted to be attached to a pipe or other member, and means for preventing accidental bodily turning of said body when the same is attached to the pipe or other member, said means including a lug formed integrally with said body portion adjacent said nipple, and a set screw adjustably threaded in said lug and adapted to be tightened against said pipe or other member.

4. An article of manufacture comprising a member having a lateral extension adapted to be inserted into a pipe or the like for attaching said member thereto, said member being provided with adjustable means for securely holding it in proper position relatively to said pipe or other member to which it is attached, said adjustable means including an integral lug, and a set screw adjustably threaded therein.

5. In a gas cock or the like, the combination with a hollow body portion having a valve associated therewith, a handle for operating said valve, said body having a threaded portion by which it is adapted to be attached to a pipe or other member, an integral lug on said body on the same side as said threaded portion, and an adjustable set screw threaded in said lug and adapted to engage said pipe or other member.

In witness that I claim the foregoing I have hereunto subscribed my name this 24th day of March, 1915.

LOUIS K. SCHWALL.

Witnesses:
JOSEPH HARRIS,
CARRIE G. RANZ.

Copies of this patent may be obtained for five cents each, by addressing the "Commissioner of Patents, Washington, D. C."